C. L. McKESSON.
AUTOMOBILE LOCKING DEVICE.
APPLICATION FILED NOV. 26, 1915.
1,194,526.
Patented Aug. 15, 1916.
Fig. 1.
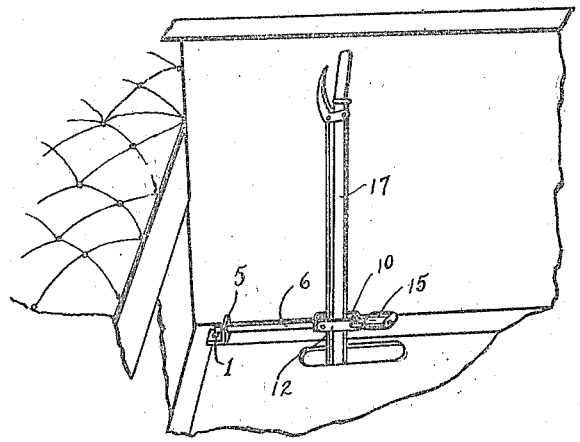
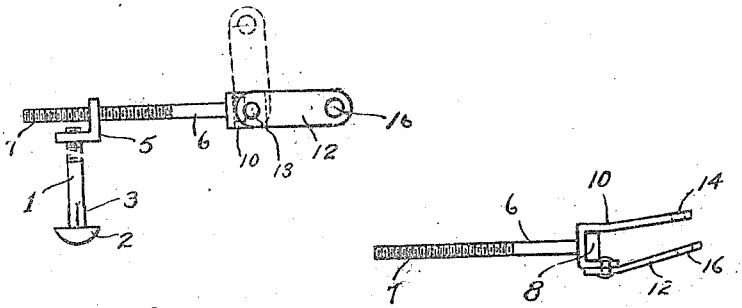
Fig. 2.
Fig. 3.
WITNESSES:
B. Mitchell
E. P. McKesson
Claude L. McKesson
INVENTOR

UNITED STATES PATENT OFFICE.

CLAUDE L. McKESSON, OF LOS ANGELES, CALIFORNIA.

AUTOMOBILE-LOCKING DEVICE.

1,194,526.  Specification of Letters Patent.  Patented Aug. 15, 1916.

Application filed November 26, 1915. Serial No. 63,387.

*To all whom it may concern:*

Be it known that I, CLAUDE L. MCKESSON, a citizen of the United States, residing in the city of Los Angeles, county of Los Angeles, and State of California, have invented a new and useful Automobile-Locking Device, of which the following is a specification.

My invention relates to the construction of a mechanical device by the use of which one of the operating levers of an automobile may be securely locked and rigidly held in a predetermined position.

The object of the invention is to provide a locking device which is easily attached to an automobile, which is readily adjustable to varying conditions, and which when in use cannot be detached from the machine or removed except by its destruction.

These and other beneficial results are attained by the use of the means herein described and illustrated in the accompanying drawings, in which,—

Figure 1 is a perspective view of the device and a portion of the automobile adjacent to the device. This figure illustrates the use of the device. Fig. 2 is a side view of the device detached from the automobile and Fig. 3 is a top view of a clevis and horizontal adjusting bolt used in the device.

Throughout the several views like characters indicate like parts and referring to the details of construction, 1 is a bolt adapted to pass through a portion of the body or frame of the auto. This bolt is made with a rounded head 2 and has a squared portion 3 to prevent its removal by turning the head of the bolt. If the hole for the bolt 1 is bored through wood its size is made to equal the diameter of the rounded portion of the bolt and the squared portion is driven in, but where the bolt passes through metal, the hole is squared to fit the bolt. The purpose of this is to prevent the turning of the bolt. The bolt has threads adapted to receive the L shaped nut 5. The nut 5 is tapped to fit the bolt 1 and also a horizontal bolt 6 placed substantially at a right angle to the bolt 1.

6 is an adjusting bolt having a threaded portion 7 and a square or rectangular head 8. This bolt 6 passes through an aperture in the closed end of the clevis 10 and the threaded end passes through the L nut 5. The clevis 10 has a movable side 12 attached to it by means of the rivet 13.

14 indicates an opening in the end of the clevis 10 through which the shackle of the lock 15 is passed and 16 is a similar opening in the movable side 12.

The manner in which the device is applied and its use is briefly described as follows.: A hole is drilled for the bolt 1 through the body or frame of an auto near the lever intended to be secured. The bolt 1 is driven into place with its head against one side of the said body or frame and its threaded end projecting far enough on the opposite side to receive the nut 5. When the said nut 5 has been placed on the bolt 1 it is turned until it is against the adjacent side of the said body or frame; the adjusting bolt 6 is then screwed into the vertical member of the L nut 5 until the clevis 10 previously placed on the head of the bolt 6 is as far from the bolt 1 as the operating lever 17 will be when in the position in which it is to be secured. The adjusting bolt and clevis 10 are then pushed out of the way by turning the nut 5 to the left until the clevis is against the side wall of the automobile.

When it is desired to lock the automobile, the operating lever is brought into the position in which it is to be secured. The movable side 12 of the clevis 10 is raised to a vertical position, as indicated by dotted lines in Fig. 2. The clevis is then brought against the operating lever by turning the nut 5 to the right. The movable side 12 is then brought down to a position parallel to the opposite side of the clevis 10 with the openings 14 and 16 in alinement, and the operating lever 17 is secured between the sides of the clevis by the shackle of the lock 15 which is passed through the openings 14 and 16 and then locked. Obviously the L nut 5 cannot be turned or either of the bolts removed until the device is unlocked. The position in which the operating lever is to be locked may be varied by turning the adjusting bolt 6 until the clevis 10 is the desired distance from the bolt 1, but this adjustment can only be made when the device is unlocked and the operating lever 17 out of the clevis. In some automobiles the clutch and brake are operated by the same lever, and my device is particularly useful on this type of automobile for the reason that by locking a single operating lever the clutch is held open and the brake locked. By the adjustment of the bolt 6, above described, as the wear of the brake alters the position of the lever when the brake is set the position of the lock may be adjusted to correspond and the automobile may always be secured by locking it with the brake tightly set.

Any suitable form of lock may be used and the particular form of the lock is not material to this invention.

Having thus described my invention what I claim as new and desire to secure by Letters Patent is:

1. In a locking device, the combination of a clevis having a movable side, openings in the ends adapted to receive the shackle of a lock; said movable side; an adjusting bolt having an angular head securely held within said clevis; means for securing said adjusting bolt to an automobile; and a lock adapted to pass through the openings in the end of the clevis thereby closing the end of said clevis.

2. In an automobile locking device, the combination of a bolt adapted to pass through the body or frame of an automobile; squared shoulders on said bolt to prevent its being turned; an L shaped nut threaded to fit the end of said bolt and also threaded to receive the end of an adjusting bolt; said adjusting bolt having a threaded portion fitted to pass through the said nut and having a head rectangular in shape; a clevis having in its closed end an aperture through which the said adjusting bolt passes and being fitted to the head of the said adjusting bolt in such manner that the head of said bolt cannot be turned without also turning the said clevis; a movable side pivotally attached to said clevis; openings in the ends of the said clevis and the said movable side adapted to receive the shackle of a lock; and a lock having said shackle adapted to close the open end of said clevis.

Signed in the presence of two subscribing witnesses.

CLAUDE L. McKESSON.

In the presence of—
B. MITCHELL,
E. P. McKESSON.